United States Patent
Kawasaki et al.

(10) Patent No.: US 6,577,941 B2
(45) Date of Patent: Jun. 10, 2003

(54) APPARATUS AND METHOD FOR DETERMINING CONDITION OF ROAD SURFACE

(75) Inventors: Hiroaki Kawasaki; Yukio Nakao, both of Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/801,643

(22) Filed: Mar. 9, 2001

(65) Prior Publication Data

US 2001/0029420 A1 Oct. 11, 2001

(30) Foreign Application Priority Data

Mar. 9, 2000 (JP) .......................... 2000-064963
May 26, 2000 (JP) .......................... 2000-155719

(51) Int. Cl.$^7$ ................................ G06F 7/00
(52) U.S. Cl. ............................. 701/70; 701/80
(58) Field of Search ..................... 701/70, 71, 79, 701/80, 73, 74

(56) References Cited

U.S. PATENT DOCUMENTS 4,755,945 A * 7/1988 Kade et al. ............... 701/73
5,586,028 A * 12/1996 Sekine et al. ............. 701/73
5,771,480 A * 6/1998 Yanase ..................... 701/80

FOREIGN PATENT DOCUMENTS

DE    37 05 983 A      9/1987
EP    0 575 944 A1    12/1993

* cited by examiner

Primary Examiner—William A. Cuchlinski, Jr.
Assistant Examiner—Edward Pipala
(74) Attorney, Agent, or Firm—Birch, Stewart, Kolasch & Birch, LLP (57) ABSTRACT

An apparatus for determining a condition of road surface comprising: rotational speed detecting means for periodically detecting rotational speeds of four tires of a vehicle; first computing means for computing a slip ratio from measurement values of the rotational speed detecting means; second computing means for obtaining a relational formula between the slip ratio and either the acceleration or deceleration of the vehicle; and friction coefficient judging means for judging a coefficient of friction occurring between a road and a tire on the basis of a slope of the relational formula obtained by the second computing means. The road friction coefficient can be judged with high accuracy in a short time using only the wheel rotational speed information of four wheels, whereby the performance and safety of a vehicle can be increased.

8 Claims, 11 Drawing Sheets

APPARATUS AND METHOD FOR DETERMINING CONDITION OF ROAD SURFACE

BACKGROUND OF THE INVENTION

The present invention relates to an apparatus and method for determining a condition of road surface. More particularly, the invention relates to an apparatus and method for determining a condition of road surface, which can increase the performance and safety of a vehicle by judging a coefficient of friction occurring between a road and a tire (road friction coefficient) by using rotational information of four tires.

When a vehicle suddenly accelerates or stops on a slippery road, there is a risk that the tires slip and spin. By sudden movements of the steering wheel, there is a possibility that the vehicle skids or spins.

Conventionally, there have been proposed techniques such as an antilock braking system (ABS) for reducing a brake torque acting on wheels to prevent the wheels from being locked before a damping force between tires and a road exceeds the maximum value and the tires are locked, thereby controlling the rotational speed of the wheels at which the maximum damping force can be obtained (Japanese Unexamined Patent Publication Nos. 99757/1985 and 249559/1989 and the like).

For example, in the control of the antilock braking system, a slip ratio is calculated from a judged vehicle speed and a detected wheel speed (rotational speed) and, after that, a braking force is controlled so that the calculated slip ratio coincides with a preset reference slip ratio. In such a manner, the maximum damping force is followed.

In the control of such an ABS or the like, a coefficient $\mu$ of friction on a road is used. Specifically, according to the coefficient $\mu$ of friction on a road (road friction coefficient $\mu$), that is, whether the road friction coefficient $\mu$ is high or low, the contents of a control are changed to thereby perform the optimum control.

In the system of Japanese Unexamined Patent Publication No. 99759/1985, vehicle acceleration is calculated from a following wheel at the time of occurrence of a slip, and the road friction coefficient $\mu$ is judged by using the acceleration.

More specifically, according to the technique disclosed in the publication, when the vehicle acceleration at the time of slip is A and the vehicle weight is W, a driving force F necessary to accelerate the vehicle is calculated as follows.

$$F = W \cdot A/g \text{ (where, g denotes acceleration due to gravity)}$$

On the other hand, the driving force F is determined by a frictional force generated between the driving wheel and the road and can be expressed as $F = \mu \cdot Wr$ by using a load Wr applied on the driving wheel and the road friction coefficient $\mu$. The road friction coefficient $\mu$ can be calculated from the above two equation as $\mu = W/Wr \cdot g \times A$.

The road friction coefficient $\mu$ obtained by the equation is, however, a road friction coefficient $\mu$ at the time when the vehicle acceleration A is calculated by replacing the acceleration of the following wheel derived by simply differentiating the rotational speed of the following wheel with the vehicle acceleration A. It is not known whether or not the road friction coefficient $\mu$ is the actual coefficient $\mu$ of friction between the road and the tire. The probability that it is not the actual road friction coefficient $\mu$ is overwhelmingly high.

When various vehicle dynamic controls of an ABS and the like are performed on the basis of such a road friction coefficient $\mu$, since the controls are not based on the actual road friction coefficient $\mu$, it is feared that improper controls are executed. Also in the case of alarming the driver that the road is slippery, when the judged road friction coefficient $\mu$ is used, an erroneous alarm might be given. Further, the slip ratio at which the maximum damping force is obtained varies according to the road friction coefficient $\mu$. Consequently, when a follow-up control is performed on the basis of a fixed slip ratio, it is feared that the braking distance becomes longer or tires are locked.

As a measure, it is necessary to judge the road conditions and vary a reference slip ratio according to the judged road friction coefficient $\mu$. There is not, however, a technique for judging the road friction coefficient $\mu$ with precision.

An object of the invention is to provide an apparatus and method for determining a condition of road surface, which can increase the performance and safety of a vehicle by judging a coefficient of friction occurring between a road and tires by using rotational information of four tires.

SUMMARY OF THE INVENTION

In accordance with the present invention, there is provided an apparatus for determining a condition of road surface comprising: rotational speed detecting means for periodically detecting rotational speeds of four tires of a vehicle; first computing means for computing a slip ratio from measurement values of the rotational speed detecting means; second computing means for obtaining a relational formula between the slip ratio and either the acceleration or deceleration of the vehicle; and friction coefficient judging means for judging a coefficient of friction occurring between a road and a tire on the basis of a slope of the relational formula obtained by the second computing means.

In accordance with the present invention, there is also provided a method for determining a condition of road surface comprising the steps of: periodically detecting rotational speeds of four tires of a vehicle; computing a slip ratio from the measured rotational speeds; obtaining a relational formula between the slip ratio and either the acceleration or deceleration of the vehicle; comparing a slope of the relational formula with a preset threshold; and judging a coefficient of friction occurring between a road and a tire from a result of the comparison.

In accordance with the present invention, there is further provided an apparatus for determining a condition of road surface comprising: rotational speed detecting means for periodically detecting rotational speeds of four tires of a vehicle; first computing means for computing either the acceleration or deceleration of the vehicle and a slip ratio of tires from measurement values of the rotational speed detecting means; moving-average calculating means for calculating a moving average from the acceleration or deceleration of the vehicle and the slip ratio in predetermined time; weighted moving-average calculating means for performing moving average on the moving average value obtained by the moving-average calculating means; second computing means for obtaining a relational formula between the acceleration or deceleration of the vehicle and the slip ratio from weighted moving averages obtained by the weighted moving average calculating means; and friction coefficient judging means for judging a coefficient of friction occurring between a road and a tire on the basis of a slope of the relational formula obtained by the second computing means.

In accordance with the present invention, there is still further provided a method for presuming a condition of road surface comprising the steps of: periodically detecting rotational speeds of four tires of a vehicle; computing acceleration or deceleration of the vehicle and a slip ratio of tires from the measured rotational speed; calculating a moving average of the acceleration or deceleration of the vehicle and the slip ratio in predetermined time; performing moving average on the moving average value obtained in the moving average calculating step; obtaining a relational formula between the acceleration or deceleration of the vehicle and the slip ratio from the weighted moving averages obtained by the weighted moving average calculating means; comparing a slope of the relational formula with a preset threshold; and judging a coefficient of friction occurring between a road and a tire from a result of the comparison.

DETAILED DESCRIPTION

An apparatus and method for determining a condition of road surface of the invention will be described hereinbelow with reference to the attached drawings.

Figure 1:
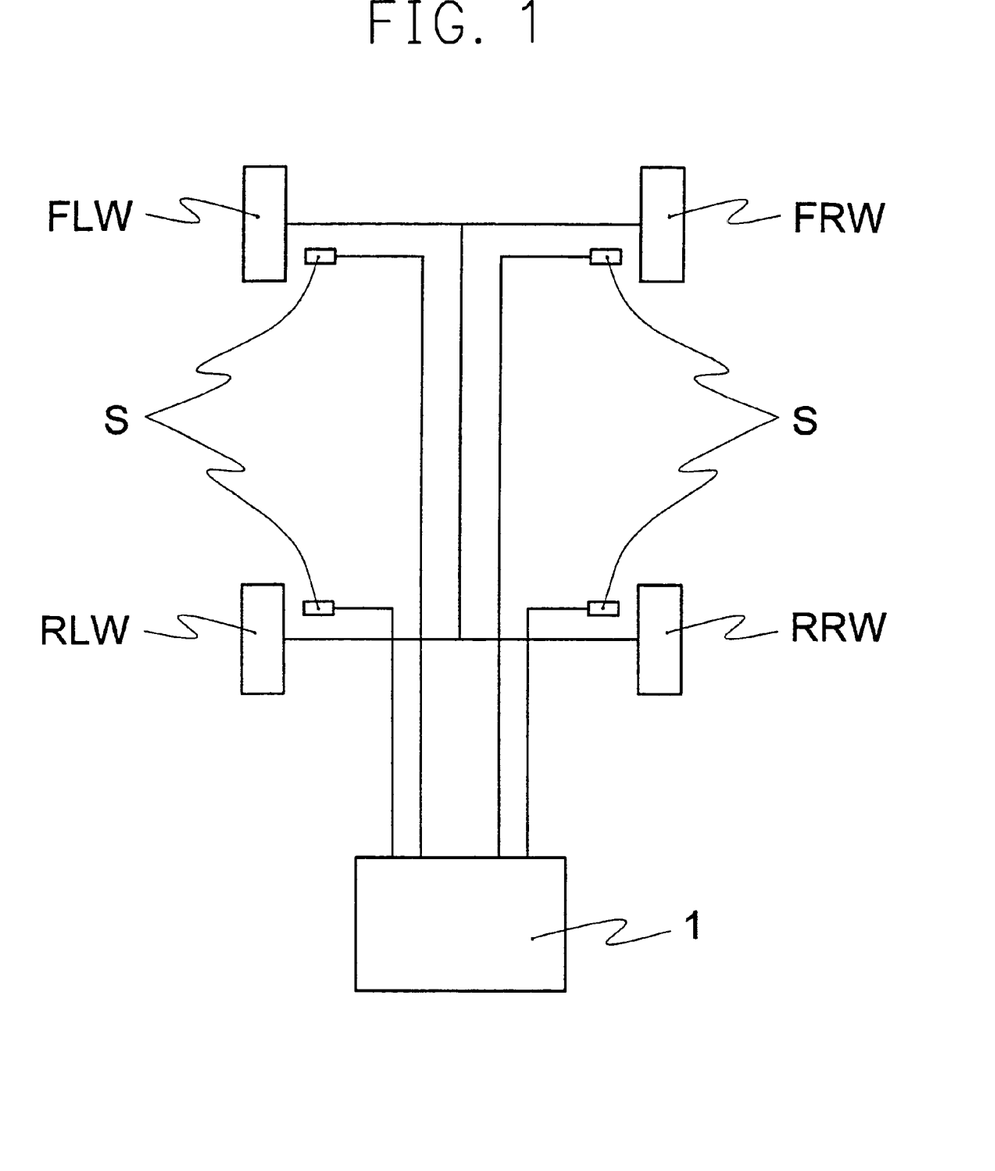
FIG. 1 is a block diagram showing an apparatus for determining a condition of road surface according to a first embodiment of the invention.
Figure 2:
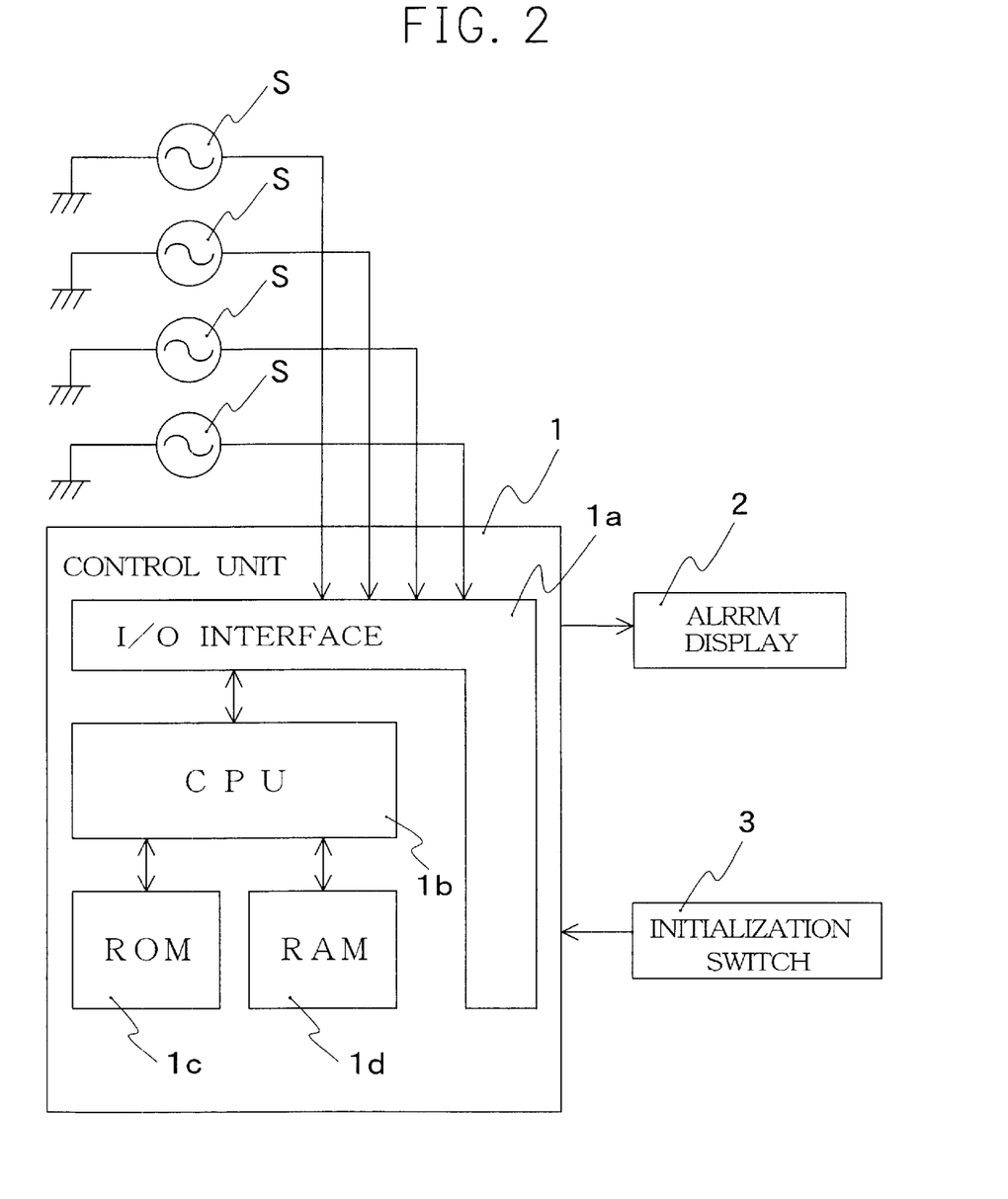
FIG. 2 is a block diagram showing an electric arrangement of the apparatus for determining a condition of road surface in FIG. 1.

As shown in FIG. 1, an apparatus for determining a condition of road surface according to an embodiment of the invention has rotational speed detecting means S provided for each of tires FLW, FRW, RLW, and RRW of a four-wheel vehicle to periodically detect the rotational speeds of the tires. Outputs of the rotational speed detecting means S are transmitted to a control unit 1 such as ABS. To the control unit 1, as shown in FIG. 2, an alarm display 2 as display means constructed by a liquid crystal display device, plasma display device, CRT or the like is connected. Reference numeral 3 denotes an initialization switch operated by the driver.

The rotational speed detecting means S takes the form of, for example, a wheel speed sensor for measuring a rotational speed from the number of rotation pulses generated by using an electromagnetic pickup or the like, or an angular velocity sensor for measuring a rotational speed from a voltage generated by using rotation by a dynamo electric.

The control unit 1 includes, as shown in FIG. 2, an I/O interface 1a necessary for the transmission/reception of signals to/from an external device, a CPU 1b functioning as the center of computing processes, a ROM 1c in which a control operation program of the CPU 1b is stored, and a RAM 1d to which data is temporarily written when the CPU 1b performs a control operation and from which the written data or the like is read.

In the embodiment, the control unit 1 is provided with, as first solving means, first computing means for computing a slip ratio (ratio between the wheel speed of a front tire and the wheel speed of a rear tire) from measurement values obtained by the rotational speed detecting means S, second computing means for obtaining a relational formula between the slip ratio and acceleration or deceleration of the vehicle, and friction coefficient judging means for judging a coefficient $\mu$ of friction occurring between a road and a tire on the basis of a slope of the relational formula obtained by the second computing means. The friction coefficient judging means includes comparing means for comparing a slope e of the relational formula obtained by the second computing means with a preset threshold.

In the embodiment, the rotational speeds of the four tires are detected within 0.1 second or less, preferably, 0.05 second or less. Although the acceleration or deceleration of the vehicle can be measured by a G sensor, from the view point of costs, it is preferable to calculate it from an average wheel speed of four wheels or following wheels.

Subsequently, the slip ratio and the acceleration or deceleration of the vehicle are subjected to moving average every sampling time as an average value of data of predetermined time, for example, data of 0.1 second or longer. On the basis of the value obtained by the moving average (predetermined number of data pieces of the slip ratio and acceleration or deceleration of the vehicle), a relational formula between the slip ratio and the acceleration or deceleration of the vehicle is obtained.

By using data, for example, at least five pieces of data of the slip ratio and the acceleration or deceleration of the vehicle, a linear regression coefficient and a correlation coefficient between the slip ratio and the acceleration or deceleration of the vehicle are calculated. When the slip ratio obtained by the moving average is a predetermined value or higher, or a predetermined value or smaller (for instance 0.07 or higher, or −0.07 or lower), the slip ratio is not used for the calculation of the regression coefficient and an alarm of slip might be issued.

When the value of the correlation coefficient is the set value or larger, the regression coefficient is updated and held. By comparing the value of the regression coefficient with a preset threshold, a coefficient of friction occurring between a tire and a road is judged.

In the embodiment, when the road friction coefficient t is judged to be low by the road friction coefficient judging means, an alarm is issued on the alarm display 2.

The operation of an apparatus for determining a condition of road surface of the embodiment will be described hereinbelow in accordance with the order of the procedures 1 to 8.

1. Wheel speeds ($V1_n$, $V2_n$, $V3_n$, and $V4_n$) are calculated from rotational speeds of the four tires FLW, FRW, RLW and RRW of the vehicle, respectively.

For example, wheel speed data at a certain time point of the wheel tires FLW, FRW, RLW, and RRW of the vehicle obtained from sensors such as ABS sensors are used as the wheel speeds $V1_n$, $V2_n$, $V3_n$, and $V4_n$, respectively.

2. Average wheel speeds ($Vf_n$, $Vd_n$) of a following wheel and a driving wheel are computed.

In the case of a front-wheel drive, the average wheel speeds $Vf_n$ and $Vd_n$ of a following wheel and a driving wheel at a certain time point can be calculated by the following equations (1) and (2).

$$Vf_n = (V3_n + V4_n)/2 \tag{1}$$

$$Vd_n = (V1_n + V2_n)/2 \tag{2}$$

3. Subsequently, average wheel acceleration or deceleration $Af_n$ of the following wheel (that is, either acceleration or deceleration of the vehicle) is calculated.

When average wheel speed immediately preceding to the average wheel speed $Vf_n$ of the following wheel is set as $Vf_{n-1}$, the average wheel acceleration or deceleration $Af_n$ of the following wheel is derived from the following equation (3).

$$Af_n = (Vf_n - Vf_{n-1})/\Delta t/g \tag{3}$$

where, $\Delta t$ denotes a time interval (sampling time) between the wheel speeds $Vf_n$ and $Vf_{n-1}$ calculated from the wheel speed data, and g indicates acceleration due to gravity. In order to suppress variations in data and make judgment in short time, the sampling time has to be 0.1 second or less. More preferably, it is 0.05 second or less.

4. According to the value of the acceleration or deceleration $Af_n$ of the vehicle, the slip ratio is computed.

First, a case where the driving wheels are locked and the vehicle slides in an acceleration state ($Vd_n=0$, $Vf_n \neq 0$), or a case where the driving wheels spin while the vehicle stops in a deceleration state ($Vf_n=0$, $Vd_n \neq 0$), is regarded not to occur, and thus the slip ratio S, is computed from the following equations (4) and (5).

In the case where $Af_n \geq 0$ and $Vd_n \neq 0$, $S_n = (Vf_n - V_n)/Vd_n$ (4)

In the case where $Af_n < 0$ and $Vf_n \neq 0$, $S_n = (Vf_n - Vd_n)/Vf_n$ (5)

In the other cases, $S_n = 1$.

5. After that, the data of the slip ratio and acceleration or deceleration of the vehicle is subjected to moving average every sampling time.

Since the road friction coefficient $\mu$ in an actual drive is not constant but changes from moment to moment, it has to be estimated in short time. In the case of performing linear regression, when there is not the certain number of pieces of data, the reliability of an obtained regression coefficient is low. Consequently, by sampling data every short sampling time, for example, tens ms, data having a large variation obtained in the sampling time is subjected to moving average. In such a manner, variations in the data can be reduced without decreasing the number of pieces of data.

The slip ratio is subjected to moving average as follows.

$$MS_n = (S_1 + S_2 + \ldots + S_n)/N \tag{6}$$

$$MS_{n+1} = (S_2 + S_3 + \ldots + S_{n+1})/N \tag{7}$$

$$MS_{n+2} = (S_3 + S_4 + \ldots + S_{n+2})/N \tag{8}$$

The acceleration or deceleration of the vehicle is subjected to moving average as follows.

$$MAf_n = (Af_1 + Af_2 + \ldots + Af_n)/N \tag{9}$$

$$MAf_{n+1} = (Af_2 + Af_3 + \ldots + Af_{n+1})/N \tag{10}$$

$$MAf_{n+2} = (Af_3 + Af_4 + \ldots + Af_{n+2})/N \tag{11}$$

6. Linear regression coefficients between the slip ratio and the acceleration or deceleration of the vehicle, that is, a regression coefficient K1 of the slip ratio with respect to the acceleration or deceleration of the vehicle and a regression coefficient K2 of the acceleration or deceleration of the vehicle with respect to the slip ratio are obtained from the following equations (12) and (13), respectively.

$$K1 = \frac{\sum (MAfi \times MSi) - N \times \overline{MAf} \times \overline{MS}}{\sum MAFi^2 - N \times \overline{MAf} \times \overline{MAf}} \tag{12}$$

$$K2 = \frac{\sum (MAfi \times MSi) - N \times \overline{MAf} \times \overline{MS}}{\sum MSi^2 - N \times \overline{MS} \times \overline{MS}} \tag{13}$$

where, $\overline{MS}$ and $\overline{MAf}$ denote an average value of N moving-averaged slip ratios and an average value of N moving-averaged acceleration or deceleration of the vehicle. For example, from Table 1, the regression coefficient K1 is calculated as 0.12 and the regression coefficient K2 is calculated as 7.27.

TABLE 1

| N | Maf | MS | Maf × MS | MAf² | MS² |
|---|-----|-----|----------|------|-----|
| 1 | 0.0270 | 0.0075 | 0.000203 | 0.000729 | 0.00005625 |
| 2 | 0.0260 | 0.0073 | 0.00019 | 0.000676 | 0.00005329 |
| 3 | 0.0250 | 0.0073 | 0.000183 | 0.000625 | 0.00005329 |
| 4 | 0.0240 | 0.0071 | 0.00017 | 0.000576 | 0.00005041 |
| 5 | 0.0260 | 0.0074 | 0.000192 | 0.000676 | 0.00005476 |
| Total | 0.128 | 0.0366 | 0.0009376 | 0.003282 | 0.000268 |
| Average | 0.0256 | 0.00732 | — | | |

A coefficient R of correlation is calculated as follows.

$$R = K1 \times K2 \tag{14}$$

When the correlation coefficient R is equal to or larger than a set value, for example, 0.6, the value of the regression coefficient K1 is updated.

Figure 3:
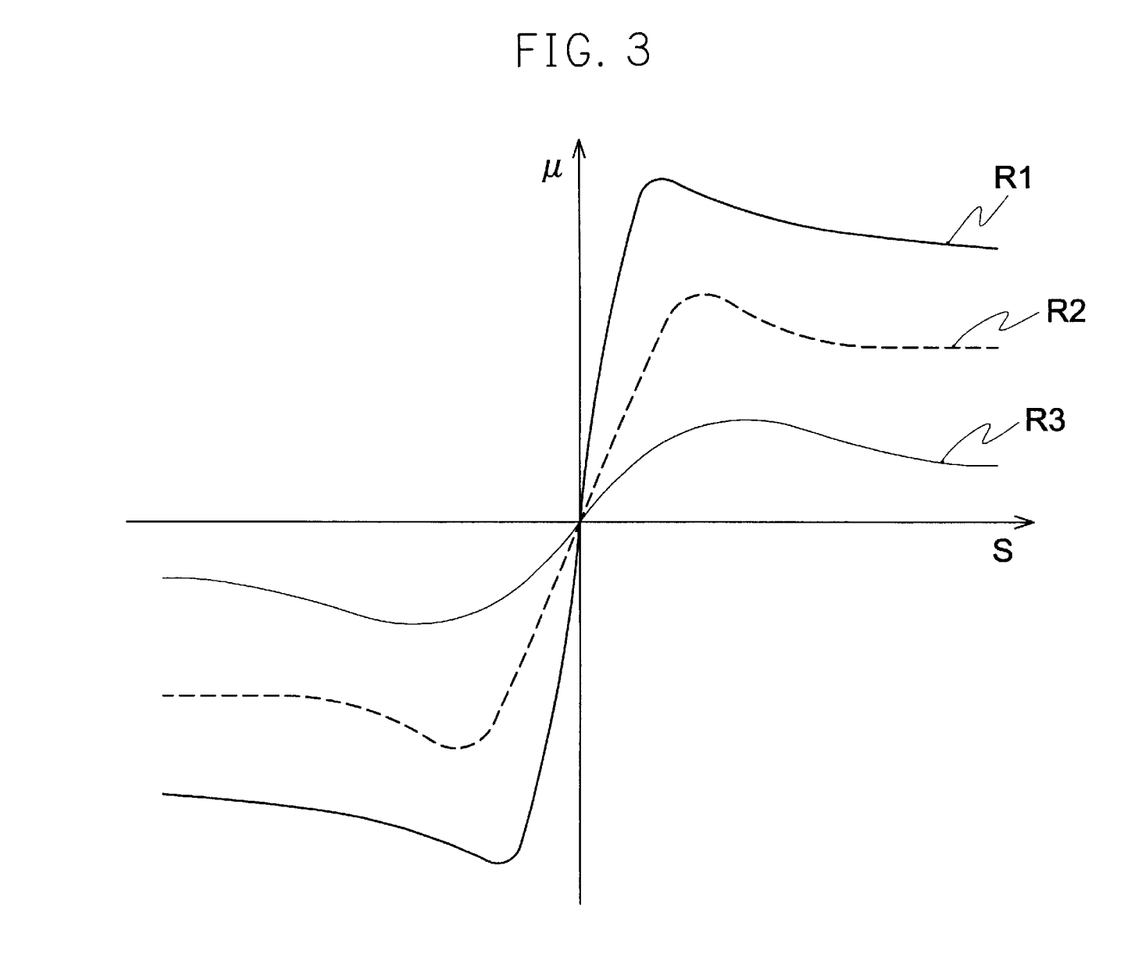
FIG. 3 is a schematic diagram showing the relation between a road friction coefficient $\mu$ and a slip ratio.

The relation between the slip ratio and the acceleration or deceleration of the vehicle is the same as a general $\mu$–s curve of tire and road. According to road friction coefficients $\mu$ (a high coefficient $\mu$ of friction on a dry asphalt road R1, an intermediate coefficient $\mu$ of friction on a snowy road R2, and a low coefficient $\mu$ of friction on a frozen asphalt road R3), the relations are as shown in FIG. 3. The regression coefficients K1 and K2 are derived from slopes of the $\mu$–s curves. The $\mu$–s curve is inherently a curve but is almost linear in the range of a slip which occurs in actual driving. That is, the $\mu$–s curve can be expressed by an equation of y=aX+b. The coefficient a in this case denotes a regression coefficient (K1, K2) and indicates the slope e of a straight line. Depending on whether the slip ratio or acceleration is used as y, a=K1 or a=K2 is derived. In the embodiment, by using the slip ratio as y, the road friction coefficient $\mu$ is judged with the value of K1. Obviously, the road friction coefficient μ can be judged also from the regression coefficient K2.

The reason of calculating the correlation coefficient R is to determine whether the obtained regression coefficient is proper or not. Specifically, when the value of the correlation coefficient R is high, there is a correlation between the slip ratio and acceleration, and the obtained regression coefficient is proper. When the value of the correlation coefficient R is low, there is not a correlation between the slip ratio and acceleration, and the obtained regression coefficient is improper, so that the road friction coefficient μ is not judged by the regression coefficient.

7. Subsequently, the road friction coefficient μ is estimated by the value of the regression coefficient K1. The following is an example.

K1≦0.1 a high road friction coefficient μ (μ=0.7 or higher)
0.1<K≦0.16 an intermediate road friction coefficient t (μ=0.3 to 0.7)
0.16<K1 a low road friction coefficient μ (μ=0.3 or lower)

A threshold of the regression coefficient K1 is obtained from, for example, past experiment data.

8. Information of the road (such that the road is slippery) is provided to the driver.

Further, the condition of the road is used for the controls of an ABS, TRC or the like.

The invention will now be described on the basis of examples but is not limited to the examples.

EXAMPLE 1

Studless tires (for instance, Graspic DS-1 made by Sumitomo Rubber Industries, Ltd.) were used as four tires of a front-wheel-drive vehicle, and the vehicle was driven on the dry asphalt road R1, the snowy road R2, and the frozen asphalt road R3. As a driving condition, the vehicle was driven around 50 km/h on respective road. In order to collect a large number of pieces of data and to eliminate variations and a measurement error, for example, one second of the sampling time of wheel speed is too long, so that the sampling time was set as 40 ms.

Figure 4:
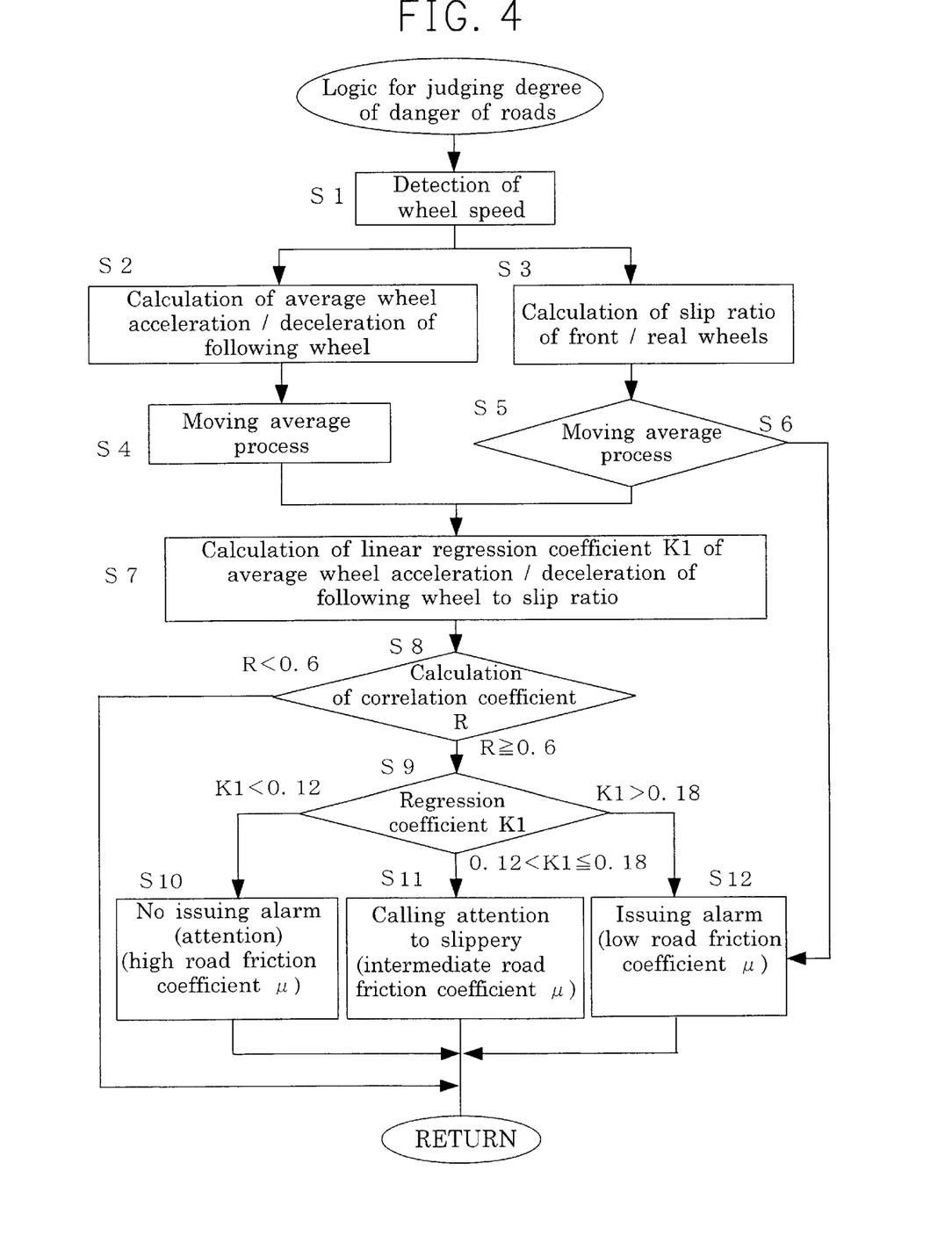
FIG. 4 is a flowchart related to the embodiment.

As shown in FIG. 4, on the basis of the wheel speed pulses outputted from the rotational speed detecting means, the wheel speed is captured, and the average wheel acceleration or deceleration of a following wheel (acceleration or deceleration) and the slip ratio of the front/rear wheels were calculated every 40 ms (steps S1, S2, and S3).

Subsequently, 25 pieces of data of one second with respect to the average wheel acceleration or deceleration of the following wheel and the slip ratio between the front and rear wheels were averaged and a moving average value was obtained every sampling time (40 ms) (steps S4 and S5). When the slip ratio becomes 0.05 or higher or −0.05 or lower, an alarm of slip was issued at the time point (step S6). In the other cases, by using 50 pieces of data of the average wheel acceleration or deceleration of the following wheel and the slip ratio subjected to moving average, the linear regression coefficient K1 of the average wheel acceleration or deceleration of the following wheel to the slip ratio was obtained (step S7).

Figure 5:
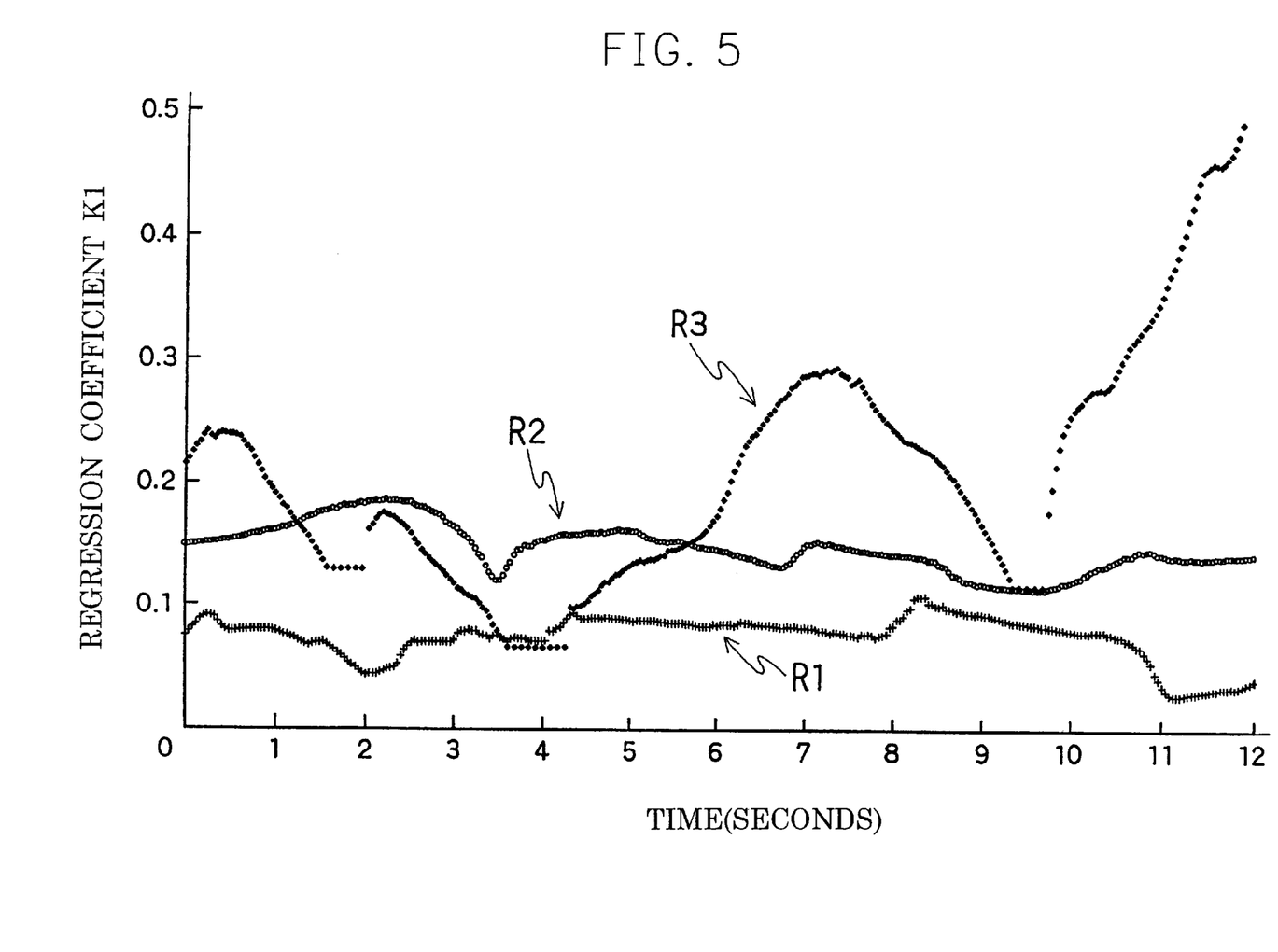
FIG. 5 is a diagram showing a change with time of regression coefficients on different road conditions.
Figure 6A:
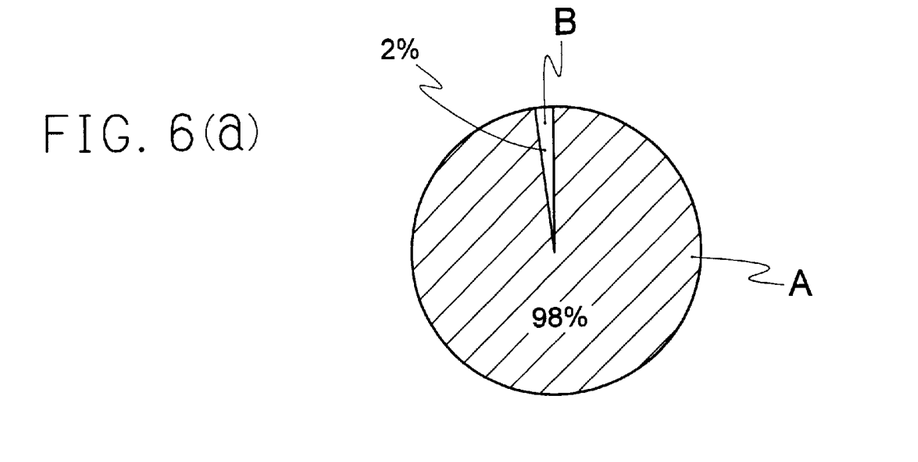
FIGS. 6(a), 6(b), and 6(c) are diagrams respectively showing the proportion of regression coefficients K1 on a dry asphalt road, a snowy road, and a frozen asphalt road in Example 2.
Figure 6B:
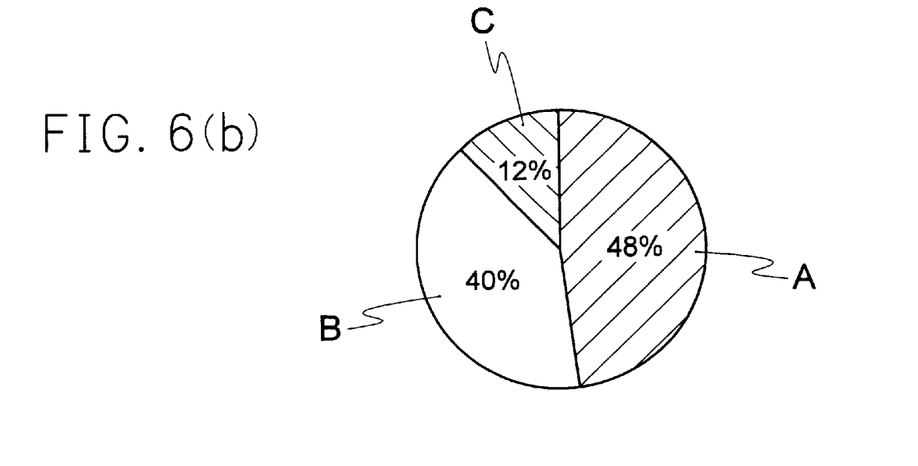
Figure 6C:
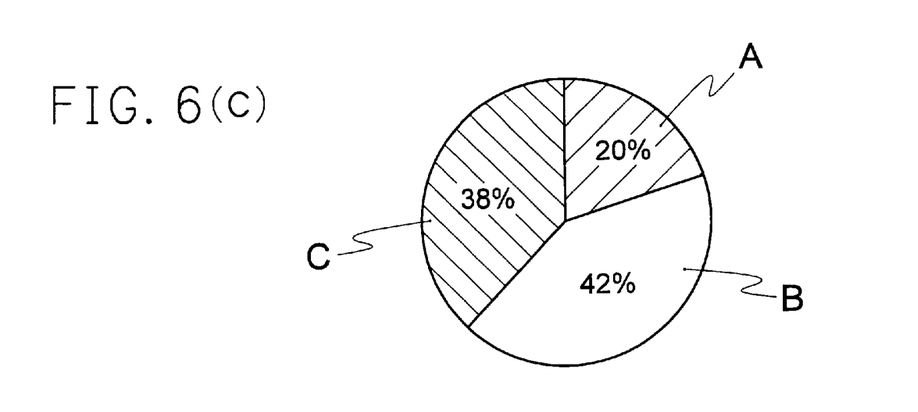
Figure 7A:
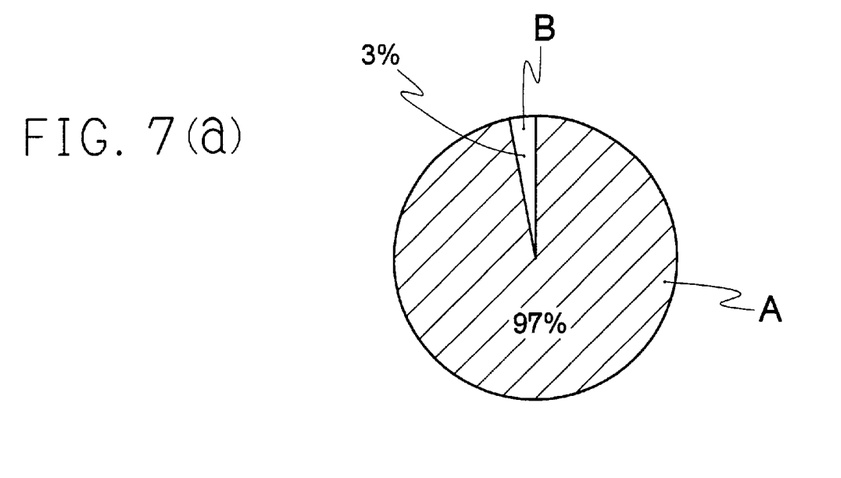
FIGS. 7(a), 7(b), and 7(c) are diagrams respectively showing the proportion of the regression coefficients K1 by thresholds on a dry asphalt road, a snowy road, and a frozen asphalt road in Example 3.
Figure 7B:
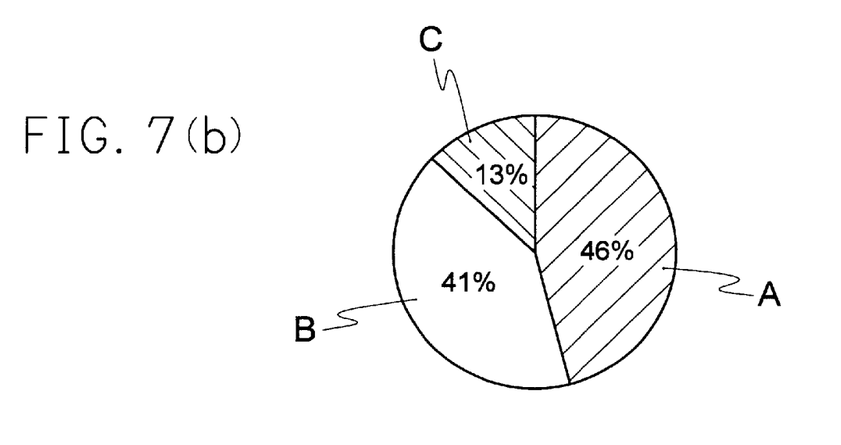
Figure 7C:
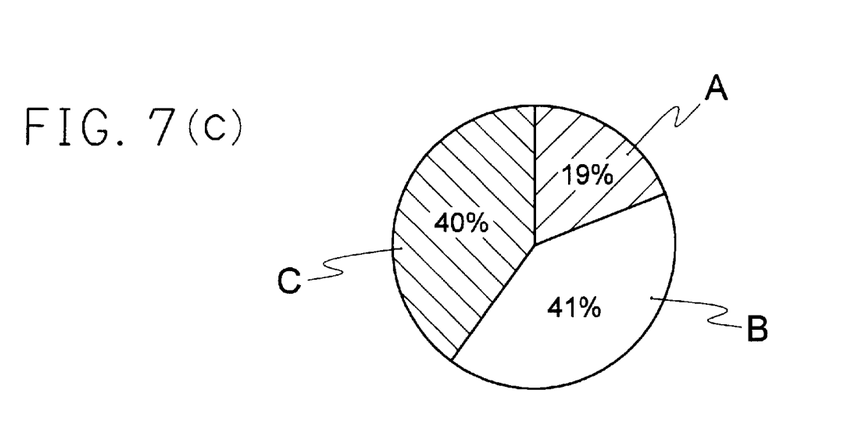
Figure 8A:
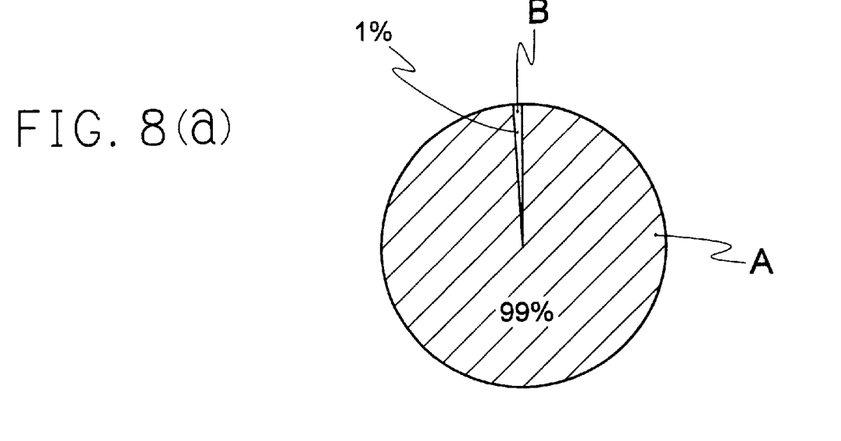
FIGS. 8(a), 8(b), and 8(c) are diagrams respectively showing the proportion of the regression coefficients K1 on a dry asphalt road, a snowy road, and a frozen asphalt road in Comparative Example 1.
Figure 8B:
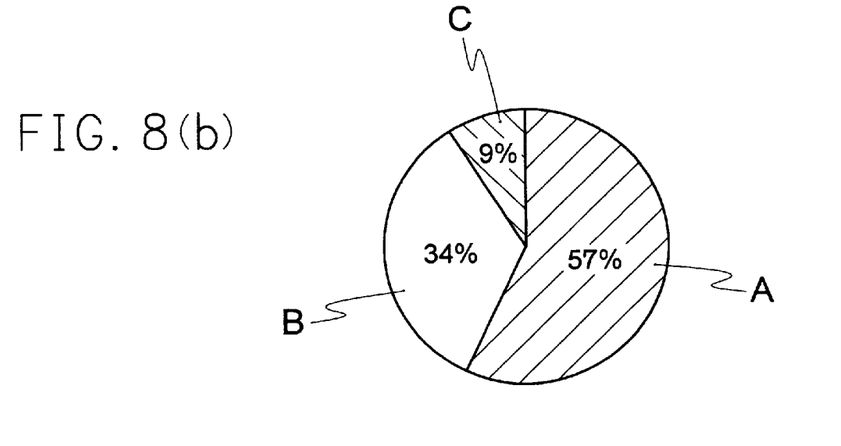
Figure 8C:
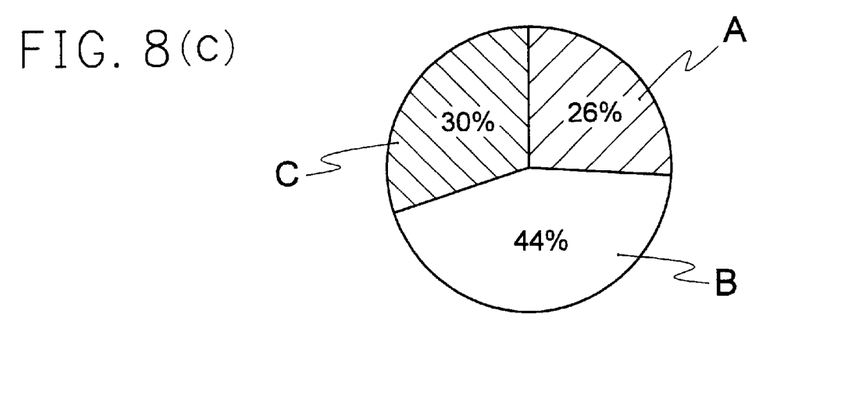
Figure 9A:
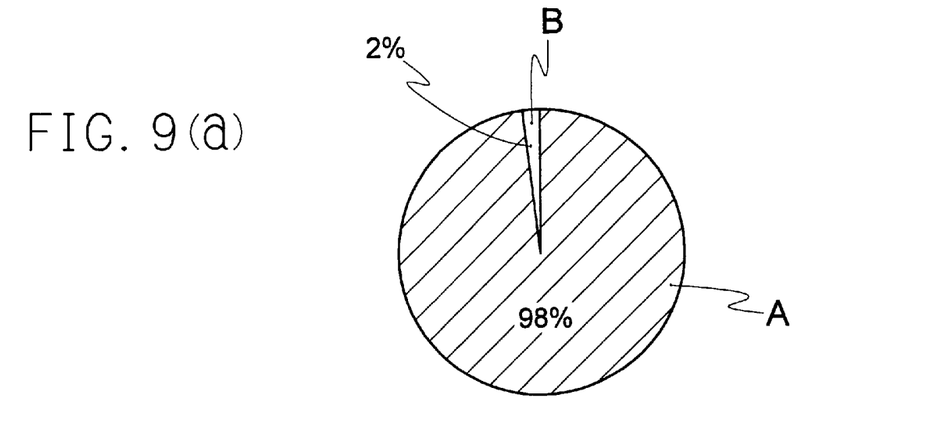
FIGS. 9(a), 9(b), and 9(c) are diagrams respectively showing the proportion of the regression coefficients K1 on a dry asphalt road, a snowy road, and a frozen asphalt road in Comparative Example 2.
Figure 9B:
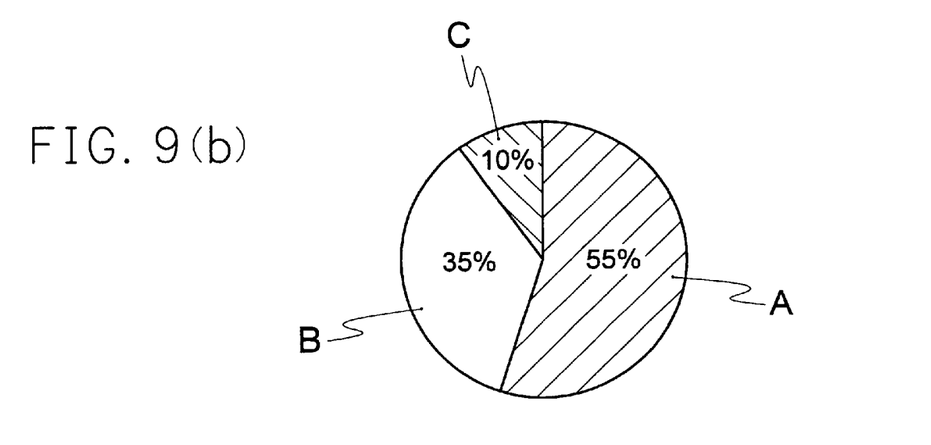
Figure 9C:
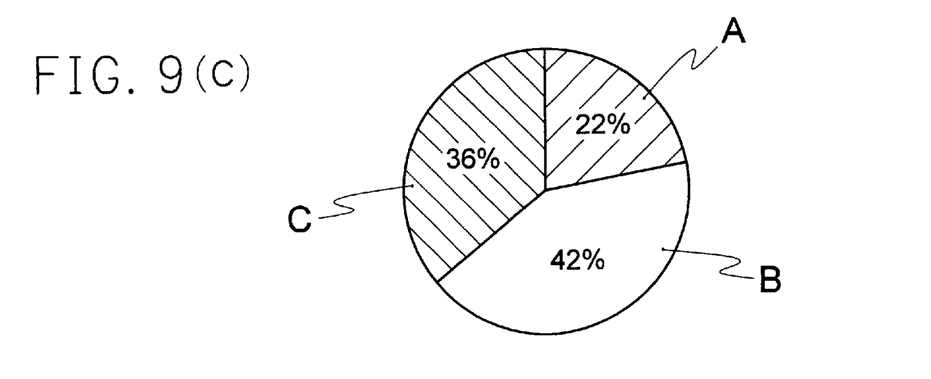
Figure 10A:
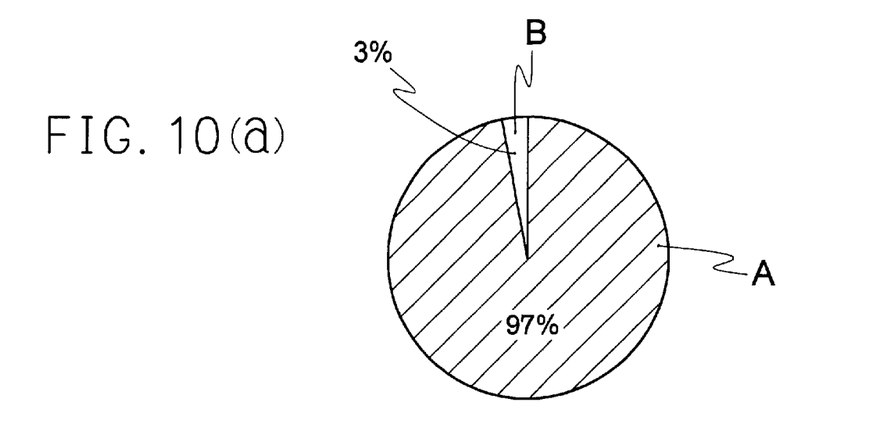
FIGS. 10(a), 10(b), and 10(c) are diagrams repectively showing the proportion of the regression coefficients K1 on a dry asphalt road, a snowy road, and a frozen asphalt road in Comparative Example 3.
Figure 10B:
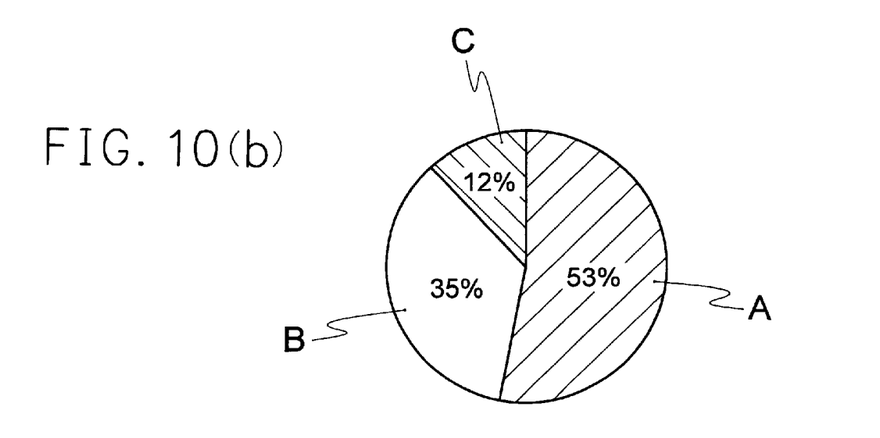
Figure 10C:
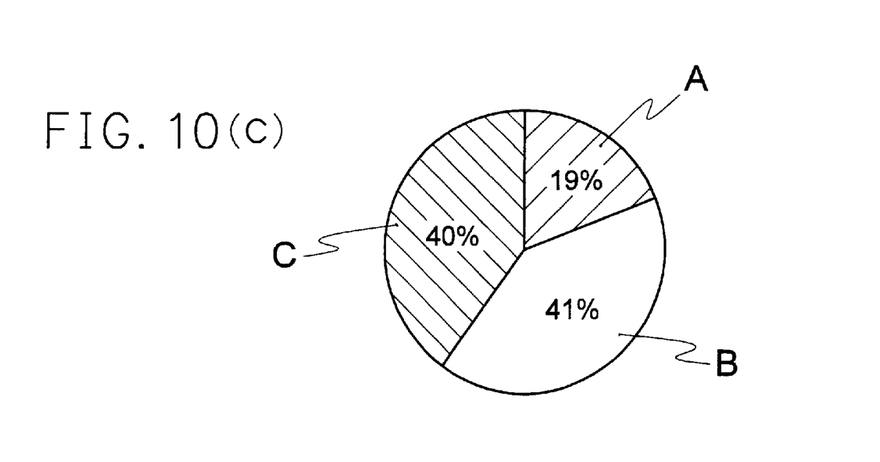

Further, the correlation coefficient R at this time was calculated (step S8). When the correlation coefficient R is 0.6 or higher, the value of the regression coefficient K was updated and held (step S9). FIG. 5 shows the change with time of the regression coefficients obtained on the roads. In the case of the dry asphalt R1, the regression coefficient K1 changes always lower than 0.12. In the case of the snowy road R2, the regression coefficient K1 changes in the range from about 0.1 to about 0.2. In the case of the frozen asphalt road R3, the value of the regression coefficient K1 largely fluctuates since the condition of the road is not constant. Although the road actually evaluated seemed dark and looked like an asphalt road at a glance, when the road was observed well, it was frozen here and there and was very slippery.

The regression coefficient K1 was compared with the preset thresholds (0.12 and 0.18), to judge the coefficient It of friction between a tire and a road. The regression coefficient K1 and the correlation coefficient R were calculated every sampling time (40 ms), and the road friction coefficient μ was judged by using the following thresholds (steps S10, S11, and S12).

K1<0.12 high road friction coefficient μ (neither alarm nor attention is issued)
0.12<K1≦0.18 intermediate road friction coefficient μ (attention to slippery is called)
0.18<K1 low road friction coefficient μ (alarm about slippery is issued)

As a result, in the case of the dry asphalt road, no attention is called and no alarm about slippery was issued. In the case of the snowy road, attention to slippery was almost always called and an alarm about slippery was rarely given. In the case of the frozen asphalt road, not only the attention to slippery was called but also alarm of slippery was frequently issued.

Although the number of data pieces for calculating the regression line was 50 in the embodiment, the invention is not limited to the value. However, if the number of data pieces is too small, a reliable result cannot be obtained. Consequently, at least five pieces of data are necessary. On the contrary, when the number of data pieces is too large, the sampling time becomes long. In the case where the conditions of a road change often, data varies, the correlation coefficient becomes low, and the case where the road friction coefficient μ cannot be determined increases as a result. It is therefore desirable to determine the number of data pieces in consideration of the sampling time.

As described above, by using the system, the road friction coefficient μ can be judged with precision in short time, and the slippery dangerous state can be notified to the driver.

By using the information of the judged road friction coefficient μ for an ABS, TRC or the like, an optimum control according to the road friction coefficient μ can be performed. When a low road friction coefficient μ is judged, it is possible to alarm the driver that the road is slippery.

Another embodiment of the invention will now be described. In the another embodiment, the control unit 1 is provided with: moving-average calculating means for calculating a moving average of the acceleration or deceleration of the vehicle and the first slip ratio in predetermined time from the measurement value obtained by the rotational speed detecting means; weighted moving-average calculating means for performing moving average on the moving average value obtained by the moving-average calculating means; second computing means for obtaining a relational formula between the acceleration or deceleration of the vehicle and the second slip ratio from weighted moving average values obtained by the weighted moving average calculating means; and friction coefficient judging means for judging a coefficient of friction occurring between a road and a tire on the basis of a slope of the relational formula obtained by the second computing means. The friction coefficient judging means includes comparing means for comparing the slope of the relational formula obtained by the second computing means with a preset threshold.

In the embodiment, the rotational speeds of the four tires are periodically detected every 0.2 second or less. Although the acceleration or deceleration of the vehicle can be measured by a G sensor, it is preferable to calculate the acceleration or deceleration of the vehicle from an average wheel speed of the four wheels or driven wheels from the view point of costs.

Subsequently, the acceleration or deceleration of the vehicle and the slip ratios are subjected to moving average every sampling time as an average value of data of predetermined time, for example, data of at least 0.1 second. With respect to the acceleration or deceleration of the vehicle and the slip ratio subjected to moving average, a moving average value is obtained by performing moving average on data of predetermined time every sampling time. On the basis of the value obtained by performing the moving average a few times or more (a predetermined number of slip ratios and acceleration or deceleration values of the vehicle), the linear regression coefficient and correlation coefficient of the slip ratio to the acceleration or deceleration of the vehicle are calculated. When the slip ratio obtained by the weighted moving average is equal to or higher than a certain set value, it is not used for the calculation of the regression coefficient, but an alarm about slip might be issued.

To reduce variations in data and judge the coefficient of friction in short time, the sampling time has to be 0.2 second or less. More preferably, it is 0.05 second or less. It is preferable that the average time of moving average of the first time is 0.2 to 2 seconds and that of the second time and subsequent times is 0.1 to 1 second.

When the value of the coefficient of correlation is a set value or higher, the regression coefficient is updated and held. By comparing the value of the regression coefficient with the preset threshold, the coefficient of friction occurring between the tire and the road is judged.

In the embodiment, when the road friction coefficient t is judged to be low by the road friction coefficient judging means, an alarm is issued by the alarm display 2.

The operations of the apparatus for presuming the condition of road surface of the embodiment are performed in the same procedures 1 to 5 in the foregoing embodiment. Generally, in the case of executing the regressing calculation, when variations in data to be subjected to regression are large, the correlation coefficient is low, and the precision of the regression coefficient deteriorates.

Consequently, when the correlation coefficient is lower than a certain value, the calculation result (regression coefficient) is not updated but the previous calculation result is used. As a result, when the ratio that the correlation coefficient is low and the calculation result is not updated is high, it means that the ratio that the road friction coefficient $\mu$ cannot be estimated is high. It is therefore important to suppress variations in data (to eliminate noise) and reduce the ratio that the correlation coefficient is low. The moving average process is performed for this purpose.

The variations in data occur due to many causes. One of the important factors is a fluctuation associated with the rotation of a tire. The fluctuation appears at the same frequency as the rotational cycles of the tire. For example, since the radius of a general tire of an ordinary-sized vehicle is about 300 mm, the circumference of a tire is about 1.9 m. In driving at 30 km/h, a frequency fluctuation of about 4.4 Hz occurs. That is, since the fluctuation occurs according to driving speed, it is feared that the fluctuations are not sufficiently suppressed by the moving average process.

For instance, when a moving average process of 0.5 second (2 Hz) is performed, frequency components of integral multiples of 2 such as 2, 4, 6, 8, . . . Hz can be eliminated but the other frequency components cannot be eliminated. When time T of the moving average increases like 1 second (1 Hz), two seconds (0.5 Hz), three seconds (0.33 Hz), . . . , many frequency components can be eliminated. The more the time T is increased, the worse the response becomes, and a necessary frequency fluctuation (ON or OFF of accelerator) might be also eliminated.

In the example, therefore, without increasing the response time (time required to judge the coefficient R of friction), by performing the weighted moving average, fluctuations are suppressed and the ratio that the correlation coefficient is low is reduced.

For this purpose, another moving average process is performed.

$$DAf_{n+m-1} = \frac{MAf_n + DAf_{n+1} + \ldots + MAf_{n+m-1}}{M} \quad (15)$$

$$DAf_{n+m} = \frac{MAf_{n+1} + MAf_{n+2} + \ldots + MAf_{n+m}}{M} \quad (16)$$

$$DAf_{n+m+1} = \frac{MAf_{n+2} + MAf_{n+3} + \ldots + MAf_{n+m+1}}{M} \quad (17)$$

The moving average process is similarly executed with respect to the slip ratio.

$$DS_{n+m-1} = \frac{MS_n + MS_{n+1} + \ldots + MS_{n+m-1}}{M} \quad (18)$$

$$DS_{n+m} = \frac{MS_{n+1} + MS_{n+2} + \ldots + MS_{n+m}}{M} \quad (19)$$

$$D_{n+m+1} = \frac{MS_{n+2} + MS_{n+3} + \ldots + MS_{n+m+1}}{M} \quad (20)$$

Subsequently, the procedures 6 to 8 in the foregoing embodiment are performed.

The embodiment will now be described based on examples. The invention is not limited only to the examples.

EXAMPLE 2

First, a front-wheel-drive vehicle was prepared and studless tires (for instance, Graspic DS-1 made by Sumitomo Rubber Industries, Ltd.) were attached thereto. The vehicle was driven on the dry asphalt road R1, snowy road R2, and frozen asphalt road R3. The driving condition on each of the roads was around 20 to 80 km/h. In order to collect a large number of pieces of data and to eliminate variations and a measurement error, for example, one second of the sampling time of wheel speed is too long, so that the sampling time was set as 40 ms.

On the basis of the wheel speed pulse outputted from the rotational speed detecting means, the wheel speed is captured, and the average wheel acceleration or deceleration of a following wheel (acceleration or deceleration of the vehicle) and the slip ratio between the front and rear wheels were calculated every 40 ms. Table 2 shows only the average wheel acceleration or deceleration of the following wheel.

TABLE 2

| No. | Time (second) | Raw data obtained every 40 ms | First moving average | Second moving average | Regression coefficient |
|---|---|---|---|---|---|
| 1 | 0.04 | 0.04 | | | |
| 2 | 0.08 | 0.06 | | | |
| 3 | 0.12 | −0.03 | | | |
| 4 | 0.16 | 0.12 | | | |
| 5 | 0.20 | −0.01 | | | |
| 6 | 0.24 | 0.07 | | | |
| 7 | 0.28 | 0.03 | | | |
| 8 | 0.32 | 0.01 | | | |

TABLE 2-continued

| No. | Time (second) | Raw data obtained every 40 ms | First moving average | Second moving average | Regression coefficient |
|---|---|---|---|---|---|
| 9 | 0.36 | 0.05 | | | |
| 10 | 0.40 | 0.00 | | | |
| 11 | 0.44 | 0.00 | | | |
| 12 | 0.48 | 0.04 | | | |
| 13 | 0.52 | −0.01 | | | |
| 14 | 0.56 | 0.04 | | | |
| 15 | 0.60 | 0.05 | | | |
| 16 | 0.64 | −0.03 | | | |
| 17 | 0.68 | 0.07 | | | |
| 18 | 0.72 | −0.02 | | | |
| 19 | 0.76 | −0.04 | | | |
| 20 | 0.80 | 0.01 | | | |
| 21 | 0.84 | −0.10 | | | |
| 22 | 0.88 | −0.05 | | | |
| 23 | 0.92 | 0.08 | | | |
| 24 | 0.96 | 0.02 | | | |
| 25 | 1.00 | 0.08 | 0.02 | | |
| 26 | 1.04 | 0.02 | 0.02 | | |
| 27 | 1.08 | 0.00 | 0.02 | | |
| 28 | 1.12 | 0.00 | 0.02 | | |
| 29 | 1.16 | 0.00 | 0.01 | | |
| 30 | 1.20 | 0.08 | 0.02 | | |
| 31 | 1.24 | 0.02 | 0.01 | | |
| 32 | 1.28 | 0.00 | 0.01 | | |
| 33 | 1.32 | 0.07 | 0.01 | | |
| 34 | 1.36 | −0.02 | 0.01 | | |
| 35 | 1.40 | 0.01 | 0.01 | | |
| 36 | 1.44 | 0.01 | 0.01 | | |
| 37 | 1.48 | −0.05 | 0.01 | 0.01 | |
| 38 | 1.52 | 0.00 | 0.01 | 0.01 | |
| 39 | 1.56 | 0.05 | 0.01 | 0.01 | |
| 40 | 1.60 | 0.04 | 0.01 | 0.01 | |
| 41 | 1.64 | 0.06 | 0.01 | 0.01 | |
| 42 | 1.68 | 0.01 | 0.01 | 0.01 | |
| 43 | 1.72 | 0.08 | 0.01 | 0.01 | |
| 44 | 1.76 | 0.03 | 0.02 | 0.01 | |
| 45 | 1.80 | 0.00 | 0.02 | 0.01 | |
| 46 | 1.84 | 0.09 | 0.03 | 0.01 | |
| 47 | 1.88 | −0.01 | 0.02 | 0.01 | |
| 48 | 1.92 | 0.03 | 0.02 | 0.02 | |
| 49 | 1.96 | 0.02 | 0.02 | 0.02 | |
| 50 | 2.00 | −0.03 | 0.02 | 0.02 | |
| 51 | 2.04 | 0.07 | 0.02 | 0.02 | |
| 52 | 2.08 | 0.02 | 0.02 | 0.02 | |
| 53 | 2.12 | 0.02 | 0.02 | 0.02 | |
| 54 | 2.16 | 0.06 | 0.03 | 0.02 | |
| 55 | 2.20 | −0.02 | 0.02 | 0.02 | |
| 56 | 2.24 | 0.08 | 0.02 | 0.02 | |
| 57 | 2.28 | 0.01 | 0.02 | 0.02 | |
| 58 | 2.32 | 0.04 | 0.02 | 0.02 | |
| 59 | 2.36 | 0.09 | 0.03 | 0.02 | |
| 60 | 2.40 | 0.01 | 0.03 | 0.02 | |
| 61 | 2.44 | 0.07 | 0.03 | 0.02 | |
| 62 | 2.48 | 0.04 | 0.03 | 0.02 | |
| 63 | 2.52 | 0.00 | 0.03 | 0.03 | |
| 64 | 2.56 | 0.09 | 0.04 | 0.03 | |
| 65 | 2.60 | 0.01 | 0.03 | 0.03 | |
| 66 | 2.64 | 0.04 | 0.03 | 0.03 | |
| 67 | 2.68 | 0.04 | 0.03 | 0.03 | |
| 68 | 2.72 | 0.00 | 0.03 | 0.03 | |
| 69 | 2.76 | 0.09 | 0.03 | 0.03 | |
| 70 | 2.80 | 0.02 | 0.03 | 0.03 | |
| 71 | 2.84 | 0.03 | 0.03 | 0.03 | |
| 72 | 2.88 | 0.03 | 0.03 | 0.03 | |
| 73 | 2.92 | 0.04 | 0.03 | 0.03 | |
| 74 | 2.96 | 0.11 | 0.04 | 0.03 | |
| 75 | 3.00 | 0.03 | 0.04 | 0.03 | |
| 76 | 3.04 | 0.04 | 0.04 | 0.03 | |
| 77 | 3.08 | 0.07 | 0.04 | 0.04 | |
| 78 | 3.12 | −0.01 | 0.04 | 0.04 | |
| 79 | 3.16 | 0.08 | 0.04 | 0.04 | |
| 80 | 3.20 | 0.02 | 0.04 | 0.04 | |
| 81 | 3.24 | 0.03 | 0.04 | 0.04 | |
| 82 | 3.28 | 0.08 | 0.04 | 0.04 | |
| 83 | 3.32 | 0.01 | 0.04 | 0.04 | |
| 84 | 3.36 | 0.07 | 0.04 | 0.04 | |
| 85 | 3.40 | 0.01 | 0.04 | 0.04 | |
| 86 | 3.44 | 0.04 | 0.04 | 0.04 | 0.04 |

Subsequently, 25 pieces of data of one second with respect to the average wheel acceleration or deceleration of the following wheel and the slip ratio between the front and rear wheels were averaged and obtained as a moving-average value every sampling time (40 ms) (refer to Table 2).

Further, data of 0.52 second (13 pieces) with respect to the moving-averaged wheel acceleration or deceleration of the following wheel and slip ratio between the front and rear wheels was averaged and obtained as a weighted moving-average value every sampling time (40 ms) (refer to Table 2).

After that, 50 pieces of data of the average wheel acceleration or deceleration and slip ratio between the front and rear wheels obtained by performing the weighted moving-average every sampling time were stored, and the linear regression coefficient K1 of the average wheel acceleration or deceleration of the following wheel to the slip ratio was calculated (refer to Table 2). The regression coefficient K1 was calculated every sampling time by replacing the oldest average wheel acceleration or deceleration and slip ratio between the front and rear wheels obtained by the weighted moving average every sampling time with new data. When the weighted-moving-averaged slip ratio became 0.5 or higher, or −0.5 or lower, the data was not added to the 50 pieces of data but an alarm of slip was issued at the time point.

Further, the correlation coefficient R at this time was calculated. When the coefficient R correlation is 0.6 or higher, the value of the regression coefficient K was updated and held. When the coefficient R correlation was lower than 0.6, the value of the regression coefficient K1 was not updated. In this case, the shortest time (response time) since the start of sampling until the regression coefficient K1 was obtained was 3.44 seconds by adding one second of the process start time of the first moving average (No. 25), 0.52 second of the processing time of the second moving average (No. 37), and 2 seconds of the processing time for storing the 50 pieces of data (No. 37 to 86) for regression and subtracting overlap time 0.08 (2×0.04) second of data (Nos. 25 and 37).

The regression coefficient K1 was compared with the preset thresholds (0.12 and 0.18), thereby judging the coefficient $\mu$ of friction between a tire and a road. The regression coefficient K1 and the correlation coefficient R were calculated every sampling time (40 ms), and the road friction coefficient $\mu$ was judged by using the following thresholds.

K1≦0.12 high road friction coefficient $\mu$ (neither alarm nor attention is issued)

0.12<K1≦0.18 intermediate road friction coefficient $\mu$ (attention to slippery is called)

0.18<K1 low road friction coefficient $\mu$ (alarm about slippery is issued)

EXAMPLE 3

In Example 3, weighted moving average was performed twice in the process of computing the same data as that in Example 2. Specifically, data of 0.76 second (19 pieces) with respect to the average wheel acceleration or deceleration of the following wheel and the slip ratio between the front and rear wheels was averaged and a moving-average value was calculated every sampling time (40 ms).

Subsequently, data of 0.36 second (9 pieces) of the moving-averaged wheel acceleration or deceleration of the following wheel and slip ratio between the front and rear wheels was averaged, and a weighted moving average value was calculated every sampling time (40 ms).

Further, the weighted moving averaged data of 0.16 second (4 pieces) with respect to the average wheel acceleration or deceleration of the following wheel and slip ratio between the front and rear wheels was averaged, and the weighted moving average value was calculated every sampling time (40 ms).

The procedure after that is the same as that in Example 2. The shortest time (response time) since the start of sampling until the regression coefficient K1 was obtained was 3.16 seconds (=0.76 second+0.36 second+0.16 second+2 seconds−0.12 second).

In a manner similar to Example 1, the coefficient $\mu$ of friction occurring between a tire and a road was judged according to the value of the obtained regression coefficient K1.

COMPARATIVE EXAMPLE 1

The same data as that in Example 2 of 0.8 second (20 pieces) with respect to the average wheel acceleration or deceleration of the following wheel and the slip ratio between the front and rear wheels was averaged without performing weighted moving average, and a moving-average value of only once was calculated every sampling time (40 ms).

The procedure after that was the same as that in Example 2. The shortest time (response time) since the start of sampling until the regression coefficient K1 was obtained was 2.76 seconds (=0.8 second+2 seconds−0.04 second).

In a manner similar to Example 2, the coefficient $\mu$ of friction occurring between a tire and a road was judged according to the value of the obtained regression coefficient K1.

COMPARATIVE EXAMPLE 2

The same data as that in Example 2 of 1.2 seconds (30 pieces) with respect to the average wheel acceleration or deceleration of the following wheel and the slip ratio between the front and rear wheels was averaged without performing weighted moving average, and a moving-average value of only once was calculated every sampling time (40 ms).

The procedure after that was the same as that in Example 2. The shortest time (response time) since the start of sampling until the regression coefficient K1 was obtained was 3.16 seconds (=1.2 second+2 seconds−0.04 second).

In a manner similar to Example 2, the coefficient It of friction occurring between a tire and a road was judged according to the value of the obtained regression coefficient K1.

COMPARATIVE EXAMPLE 3

The same data as that in Example 2 of 1.6 seconds (40 pieces) with respect to the average wheel acceleration or deceleration of the following wheel and the slip ratio between the front and rear wheels was averaged without performing weighted moving average, and a moving-average value of only once was calculated every sampling time (40 ms).

The procedure after that was the same as that in Example 2. The shortest time (response time) since the start of sampling until the regression coefficient K1 was obtained was 3.56 seconds (=1.6 second+2 seconds−0.04 second).

In a manner similar to Example 2, the coefficient $\mu$ of friction occurring between a tire and a road was judged according to the value of the obtained regression coefficient K1.

FIGS. 6(a) to 10(a) show the proportion of the regression coefficients K1 on the dry asphalt road in Examples 2 and 3 and Comparative Examples 1 to 3, FIGS. 6(b) to 10(b) show the proportion of the regression coefficients K1 on the snowy asphalt road, and FIGS. 6(c) to 10(c) show the proportion of the regression coefficients K1 on the frozen asphalt road. In FIGS. 6(a) to 6(c) to FIGS. 10(a) to 10(c), the high, intermediate, and low road friction coefficients $\mu$ by the following thresholds are indicated by A, B, and C, respectively.

K1<0.12 high road friction coefficient $\mu$ (neither alarm nor attention is issued)

0.12<K1≦0.18 intermediate road friction coefficient $\mu$ (attention to slippery is called)

0.18 <K1 low road friction coefficient $\mu$ (alarm about slippery is issued)

In all of Examples 2 and 3 and Comparative Examples 1 to 3, as shown in FIGS. 6(a) to 10(a), on the dry asphalt road, 97% of the regression coefficients K1 as a judged value was 0.12 or lower and the high road friction coefficient $\mu$ (A) was judged. As shown in FIGS. 6(b) to 10(b), on the snowy road, about 50% of the regression coefficients K was higher than 0.12 and the intermediate road friction coefficient K1 (B) or the low road friction coefficient $\mu$ (C) was judged, and attention was frequently called or alarm was frequently issued.

As shown in FIGS. 6(c) to 10(c), on the frozen asphalt road, about 80% of the regression coefficients K1 exceeded 0.12 and the intermediate or low road friction coefficient $\mu$ (B or C) was judged. Further, about the half of 80% of the regression coefficients K1 exceeded 0.18 and the low road friction coefficient $\mu$ (C) was judged. Almost always, the attention was called or the alarm was issued.

As described above, only from the above results, the coefficient $\mu$ of friction on a road can be sufficiently judged without executing the weighted moving averaging.

Figure 11:
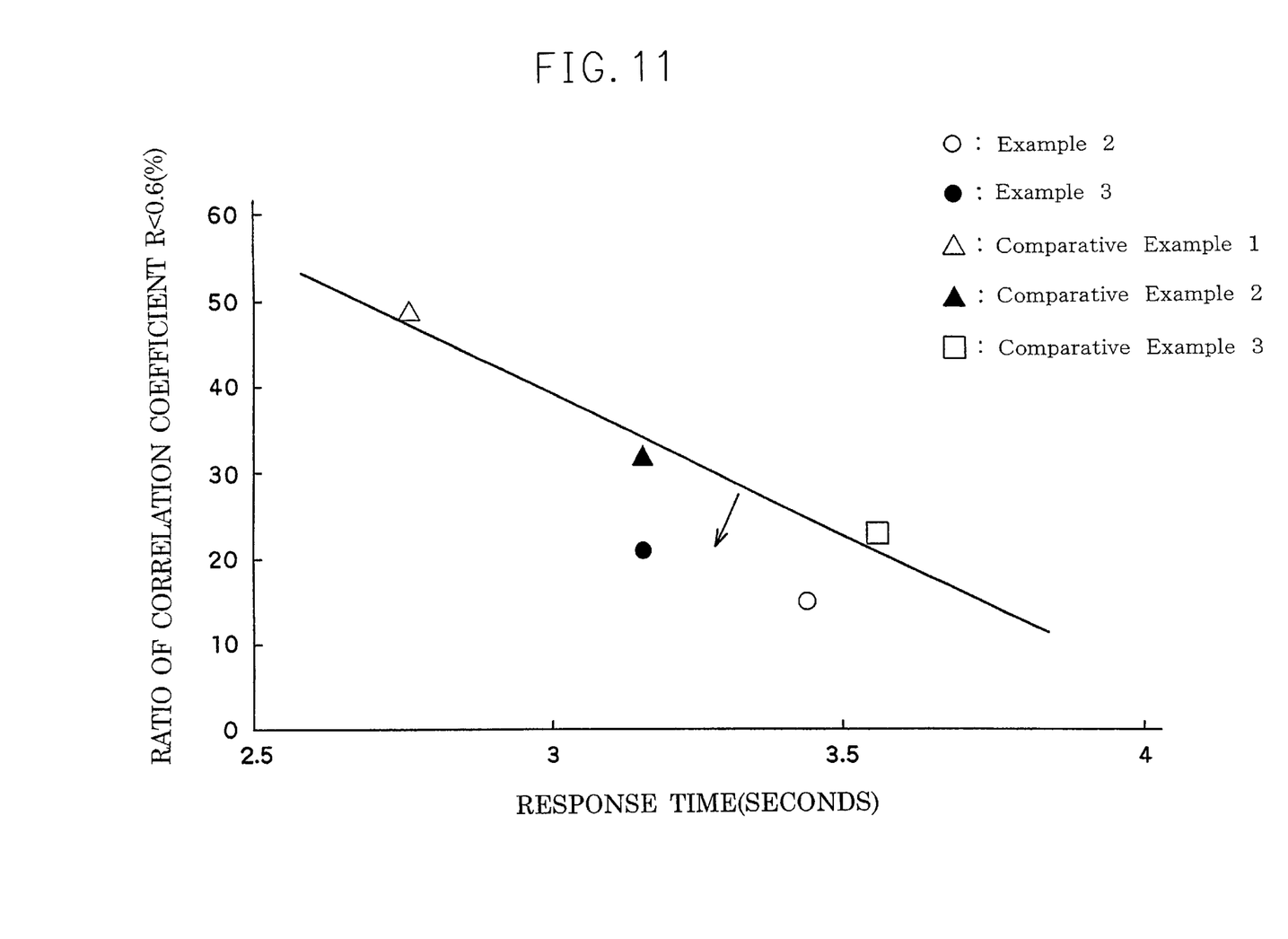
FIG. 11 is a diagram showing the relation between response time since the start of sampling until the regression coefficient K1 is obtained and the ratio that a correlation coefficient R is lower than 0.6 and the regression coefficient K1 is not updated in Examples 2 and 3 and Comparative Examples 1 to 3.

Table 3 and FIG. 11 show the relation between the shortest time from the start of sampling until the regression coefficient K1 was obtained, that is, the response time and the ratio that the correlation coefficient R was lower than 0.6 and the value of the regression coefficient K1 was not updated in Examples 2 and 3 and Comparative Examples 1 to 3. The ratio of the correlation coefficient R<0.6 is an average of the coefficients on the dry asphalt road, snowy road, and frozen asphalt road.

TABLE 3

|  | Example 2 | Example 3 | Comp. Example 1 | Comp. Example 2 | Comp. Example 3 |
|---|---|---|---|---|---|
| Response time (seconds) | 3.44 | 3.16 | 2.76 | 3.16 | 3.56 |
| Ratio (%) of R <0.6 | 15 | 21 | 49 | 32 | 23 |

Since the coefficient $\mu$ of friction on a road is not constant, the shorter the response is, the better. It is considered that the lower the ratio that the regression coefficient K1 is not updated is, the better. Consequently, the ratio that the regression coefficient K1 was not updated with respect to the response time in Examples 2 and 3 where the weighted moving average was performed is lower than that in Comparative Examples 1 to 3. It is understood that Examples 2 and 3 are more excellent than the Comparative Examples 1 to 3.

Although the number of data pieces for calculating the regression line was 50 in the embodiment, the invention is not limited to the value. When the number of data pieces is too small, the value of the regression coefficient K1 might fluctuate, the case where the correlation coefficient R is lower than 0.6 increases, and the value of the regression coefficient K1 is not smoothly updated. Consequently, at least five pieces of data are necessary. On the contrary, when the number of data pieces is too large, the sampling time becomes long. Moreover, in the case where the conditions of a road change often, data varies largely, the correlation coefficient R becomes low, and the case where the road friction coefficient $\mu$ cannot be determined often occurs as a result. It is therefore desirable to determine the number of data pieces in consideration of the sampling time.

As described above, by using the system, the road friction coefficient $\mu$ can be judged with precision in short time, and the slippery dangerous conditions can be notified to the driver.

By using the information of the judged road friction coefficient $\mu$ for an ABS, TRC or the like, an optimum control according to the road friction coefficient $\mu$ can be performed. When a low road friction coefficient $\mu$ is judged, it is possible to call the attention of the driver that the road is slippery.

As described above, according to the invention, the road friction coefficient $\mu$ can be judged with high accuracy in short time by using only the wheel rotational speed information of four wheels. Thus, the performance and safety of a vehicle can be increased.

By performing the weighted moving average on the acceleration or deceleration of the vehicle and the slip ratio between the front and rear wheels, variations in data are suppressed. The ratio that the judgment result is not updated can be reduced without increasing the response time. As a result, the road friction coefficient $\mu$ can be judged with precision in short time and, further, the performance and safety of the vehicle can be increased.

What is claimed is:

1. An apparatus for determining a condition of road surface comprising: rotational speed detecting means for periodically detecting rotational speeds of four tires of a vehicle; first computing means for computing a slip ratio from measurement values of the rotational speed detecting means; second computing means for obtaining a relational formula between the slip ratio and either acceleration or deceleration of the vehicle; and friction coefficient judging means for judging a coefficient of friction occurring between a road and a tire on the basis of a slope of the relational formula obtained by the second computing means, moving average calculating means for calculating a moving average for the acceleration or deceleration of the vehicle and the slip ratio in predetermined time; and third computing means for obtaining a relational formula between the acceleration or deceleration of the vehicle and the slip ratio on the basis of the value obtained by the moving average.

2. A method for presuming a condition of road surface comprising the steps of: periodically detecting rotational speeds of four tires of a vehicle; computing a slip ratio from the measured rotational speeds; obtaining a relational formula between the slip ratio and either acceleration or deceleration of the vehicle; comparing a slope of the relational formula with a preset threshold; and judging a coefficient of friction occurring between a road and a tire from a result of the comparison, and wherein the slip ratio and the either the acceleration or deceleration of the vehicle are subjected to moving acceleration of deceleration of the vehicle are subjected to moving average every sampling time as an average value of data of predetermined time, and on the basis of the value obtained by the moving average, a relational formula between the slip ratio and the acceleration or deceleration of the vehicle is obtained.

3. The method of claim 2, wherein the rotational speeds of four tires are detected within 0.1 second or less.

4. The method of any one of claims 2 to 3, wherein the acceleration or deceleration of the vehicle is calculated from measured values of the rotational speed detecting means of four tires.

5. The method of any one of claims 2 to 3, wherein a linear regression coefficient and a correlation coefficient between the slip ratio and the acceleration or deceleration of the vehicle are calculated by using data of the slip ratio and the acceleration or deceleration of the vehicle, and wherein the regression coefficient is updated and held when the value of the correlation coefficient is the set value or larger, and by comparing the value of the regression coefficient with a preset threshold, a coefficient of friction occurring between a tire and a road is judged.

6. An apparatus for determining a condition of road surface comprising: rotational speed detecting means for periodically detecting rotational speeds of four tires of a vehicle; first computing means for computing either acceleration or deceleration of the vehicle and a slip ratio of tires from measurement values of the rotational speed detecting means; moving-average calculating means for calculating a moving average from the acceleration or deceleration of the vehicle and the slip ratio in predetermined time; weighted moving-average calculating means for performing moving average on the moving average value obtained by the moving-average calculating means; second computing means for obtaining a relational formula between the acceleration or deceleration of the vehicle and the slip ratio from weighted moving averages obtained by the weighted moving average calculating means; and friction coefficient judging means for judging a coefficient of friction occurring between a road and a tire on the basis of a slope of the relational formula obtained by the second computing means.

7. A method for determining a condition of road surface comprising the steps of: periodically detecting rotational speeds of four tires of a vehicle; computing either the acceleration or deceleration of the vehicle and a slip ratio of tires from the measured rotational speed; calculating a moving average of the acceleration or deceleration of the vehicle and the slip ratio in predetermined time; performing moving average on the moving average value obtained in the moving average calculating step; obtaining a relational formula between the acceleration or deceleration of the vehicle and the slip ratio from the weighted moving averages obtained by the weighted moving average calculating means; comparing a slope of the relational formula with a preset threshold; and judging a coefficient of friction occurring between a road and a tire from a result of the comparison.

8. The method of claim 7, wherein a linear regression coefficient and a correlation coefficient between the slip ratio and the acceleration or deceleration of the vehicle are calculated by using data of the slip ratio and the acceleration or deceleration of the vehicle, and wherein the regression coefficient is updated and held when the value of the correlation coefficient is the set value or larger, and by comparing the value of the regression coefficient with a preset threshold, a coefficient of friction occurring between a tire and a road is judged.

* * * * *